United States Patent [19]

Sieradzki

[11] 4,319,172
[45] Mar. 9, 1982

[54] NUMERICAL CONTROL SYSTEM

[75] Inventor: Ryszard Sieradzki, Rochester, Mich.

[73] Assignee: Tracer Control Company, Hazel Park, Mich.

[21] Appl. No.: 124,294

[22] Filed: Feb. 25, 1980

[51] Int. Cl.³ .............................................. G05B 1/02
[52] U.S. Cl. .................................. 318/608; 318/618; 318/656; 318/660; 318/683
[58] Field of Search .............. 318/660, 608, 683, 618, 318/656; 328/133; 307/232, 510, 525–528; 340/347 SY

[56] References Cited

U.S. PATENT DOCUMENTS

| | | | |
|---|---|---|---|
| 3,918,045 | 11/1975 | Morser et al. | 318/660 |
| 4,034,276 | 7/1977 | Hyatt | 318/608 |
| 4,109,185 | 8/1978 | Froyd et al. | 318/608 |

Primary Examiner—Gene Z. Rubinson
Assistant Examiner—Eugene S. Indyk
Attorney, Agent, or Firm—Gifford, Van Ophem, Sheridan & Sprinkle

[57] ABSTRACT

A numerical control system is provided for a table having a relatively stationary member, a relatively movable member and a position transducer, such as an inductosyn, operatively positioned between them. The numerical control system comprises a high frequency clock which generates a pair of sinusoidal waves to the inductosyn at a lower frequency and the phase of the output signal from the inductosyn is representative of the position of the movable and stationary members. A direction and speed control circuit generates an output signal the frequency and polarity of which is indicative of the desired speed and direction of movement of the movable member, respectively, and this output signal is combined with the high frequency signal from the clock by a signal combiner. A frequency converter converts the signal from the combiner to the output frequency from the inductosyn while a phase comparator generates a digital signal representative of the phase difference between the inductosyn output and frequency converter output signals. The output from the phase comparator is representative of the difference between the requested and actual position of the movable member relative to the stationary member and its output is utilized to activate a motor controlling the position of the movable member via a digital to analog converter and amplifier.

13 Claims, 4 Drawing Figures

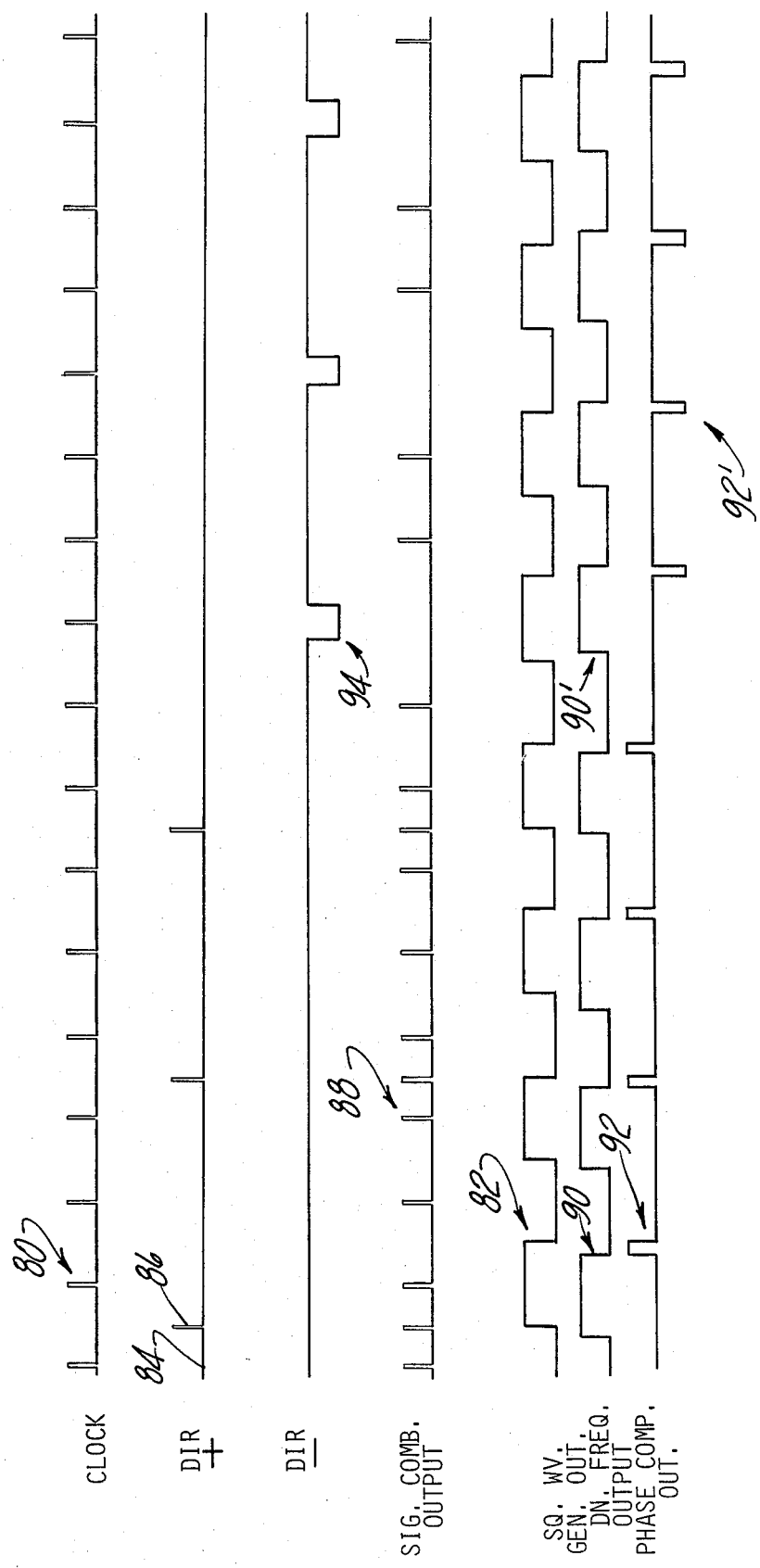

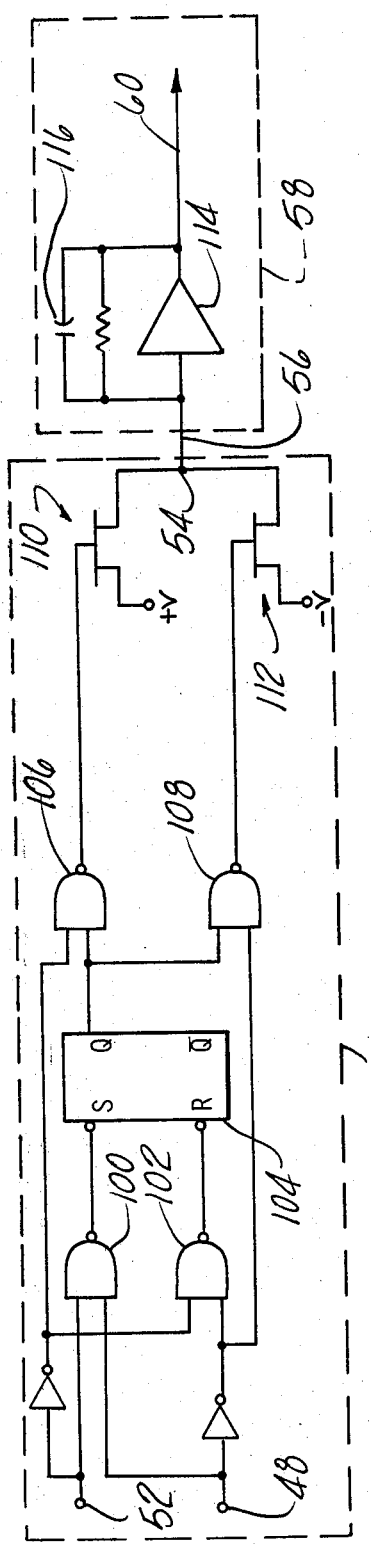
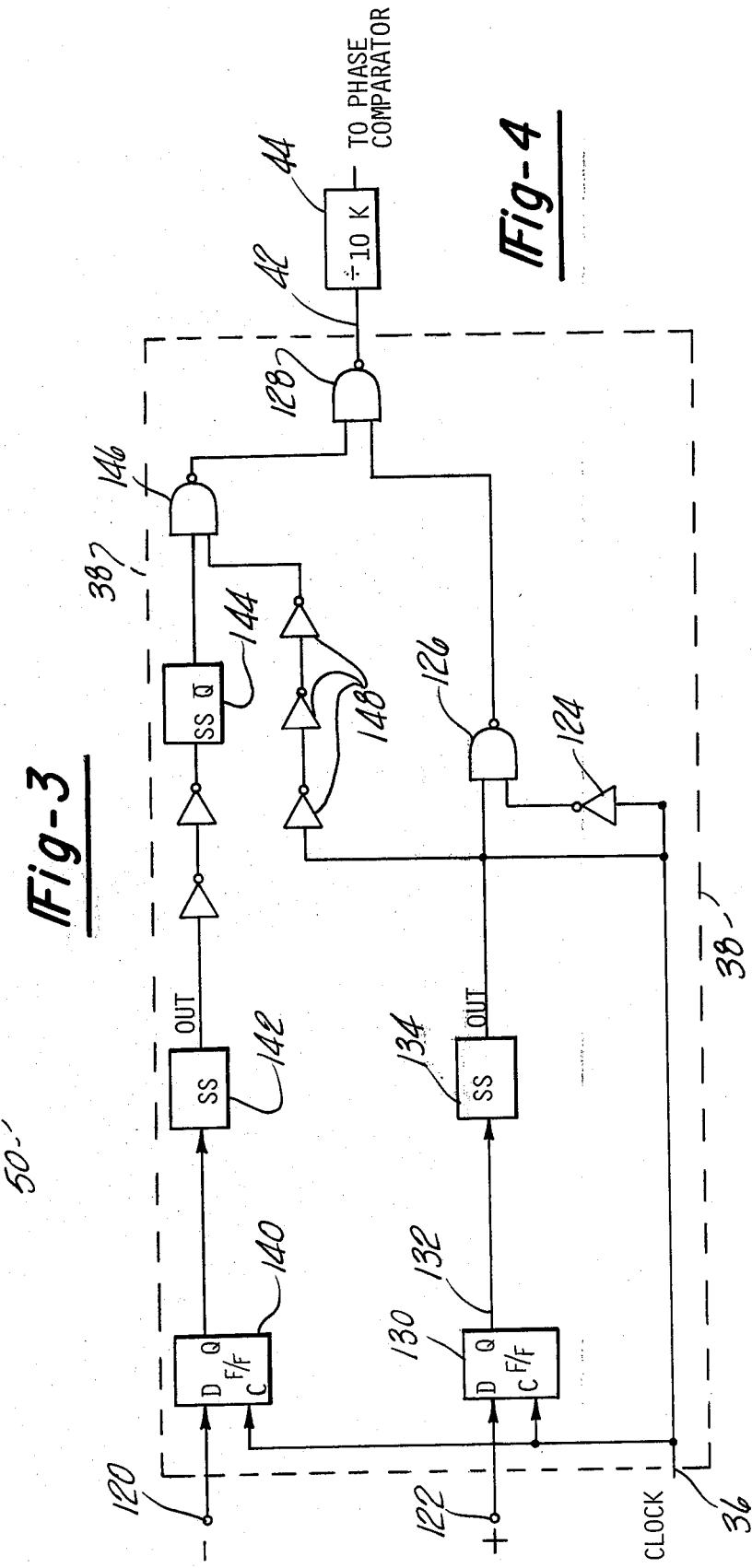

NUMERICAL CONTROL SYSTEM

BACKGROUND OF THE INVENTION

I. Field of the Invention

The present invention relates generally to numerical control systems and, more particularly, to a numerical control system for use with a table having a relatively stationary part and a movable part and which is capable of highly accurately positioning the movable and stationary parts with respect to each other.

II. Description of the Prior Art

There are a number of previously known numerical control systems for use with rotary tables having a relatively stationary part and a movable part. In such tables, a motor is operatively coupled between the movable and stationary parts and, upon actuation, sequentially positions the movable table part in a series of predetermined positions. A machining operation or the like is typically performed after the table has moved to each predetermined position.

In order to accurately position the table at each of its predetermined positions, it has been the previous practice to employ a position transducer operatively disposed between the table movable and stationary parts. Inductosyns and resolvers are two commonly used types of position transducers for such numerical control systems.

Although an inductosyn can be used in several different fashions, in one mode of operation a pair of sinusoidal waves are fed as input signals to the inductosyn and these input signals are offset by a predetermined phase difference, typically ninety (90°) degrees. Relative movement of the table movable and stationary parts causes a like movement of the inductosyn which, in turn, shifts the phase of the output signal from the inductosyn which is also sinusoidal in form. With the inductosyns currently available a phase shift of 180 degrees of the output signal occurs for every degree of revolution of the inductosyn.

These previously known numerical control systems, however, are disadvantageous in that the movable table part could only be automatically positioned on even degree intervals of movement of the table which is not sufficiently accurate from many types of precision machining operations. If additional accuracy was required, it was the previous practice with many types of the previously known numerical control systems to manually actuate the table motor means while the table operator visually read a gauge indicative of the table position between even degree increments of the inductosyn. Since automatic position control for the table was not possible when high accuracy positioning of the table was required, the overall operation of these previously known systems was relatively slow.

In still other types of previously known numerical control systems, however, automatic positioning of the table between even degree increments of the inductosyn was possible. However, even with this latter type of previously known numerical control system, the accuracy of the table position control was still limited to relatively large increments, for example 1/10 of one degree of rotation, which is still unsuitable for some high precision machining operations. Moreover, the accuracy of many of these previously known systems was dependent upon the accuracy and stability of the system clock.

SUMMARY OF THE PRESENT INVENTION

The present invention provides a high precision numerical control system for a rotary table having a stationary part and a relatively movable part and which is capable of automatically positioning the movable part at increments less than 1/1000 of one degree of rotation.

In brief, an inductosyn is operatively coupled between the table movable and stationary parts. The inductosyn further includes a pair of inputs and an output while the phase of the output signal is indicative of the absolute position of the inductosyn and thus of the absolute position of the table movable part with respect to the stationary part.

A high frequency clock generates a high frequency output signal, and preferably a square wave signal, at approximately 20 megahertz. The output signal from the clock is in turn connected as an input signal to a sinusoidal wave generator which generates a pair of sinusoidal wave forms identical to each other but offset in phase by 90 degrees. Moreover, the sinusoidal wave generator digitally converts its input signal to a much lower frequency, for example 2 kilohertz, and its output signals are connected to the indutosyn.

The output clock frequency is also fed to one input of a signal combiner while the output from the signal combiner is coupled as an input signal to a down frequency converter which digitally converts the incoming to the same frequency as that generated by the sinusoidal wave generator. The output from both the down frequency converter and also the inductosyn output are coupled as input signals to a phase comparator which generates a digital signal when there is a phase difference between the incoming signals. As will be shortly described, a phase difference would be indicative of a difference between the requested table position, as represented by the signal from the signal combiner, and the actual table position as represented by the signal from the inductosyn output.

The output from the phase comparator is in turn fed to a digital to analog converter which, via a servo drive amplifier, actuates the rotary table motor means to move the table from its actual and towards its requested position.

In order to control both the direction and speed of rotation of the table movable part, a direction and speed frequency generator has an output coupled to a second input of the signal combiner which adds or combines the output signal from the clock with the signal from the direction and speed frequency generator and generates this combined signal on its output. The speed of movement of the rotary table movable part is dependent upon the frequency of the output signal from the direction and speed (D and S) frequency generator while the direction is dependent upon the polarity of the frequency generator output signal.

In operation, the output signal frequency of the signal combiner is increased in the event that the D and S frequency generator generates a positive pulse in between adjacent clock pulses. Moreover, this increase in frequency, in effect, shifts the phase of the output signal from the frequency combiner leftward thus producing a phase difference between the output from the down frequency converter and the output from the inductosyn which activates the table motor in the previously described fashion. Conversely, in the event that the D and S frequency generator generates a negative pulse coinciding with one or more clock pulses, the effective frequency at the output from the signal combiner is reduced thus shifting the phase of the output signal from the frequency down converter rightward which likewise produces a phase difference between the down frequency converter output signal and the output signal from the inductosyn. Circuitry in the phase comparator, moreover, differentiates which input signal is leading and which is lagging and accordingly produces a positive or negative output signal to the servo drive amplifier to control the direction of rotation of the motor.

The high accuracy and precision of the numerical control system of the present invention is obtainable since the direction and speed frequency generator either adds, or subtracts, pulses from the high frequency system clock prior to the down frequency conversion of the combiner output signal. Thus, assuming the down frequency converter reduces the output signal from the signal combiner by factor of 10,000 accurate positioning of the rotary table movable part as possible to 1/10,000 of a degree of rotation. Even higher table positioning precision is obtainable by increasing the frequency of the clock and likewise increasing the magnitude of down frequency conversion of the output signal from the signal combiner although, as a practical matter, higher precision is rarely required.

The numerical control system of the present invention is further advantageous in that the frequency of the sinusoidal wave generator and likewise the control frequency to the signal combiner is derived from the output clock signal. Consequently, the precise frequency of the clock signal is unimportant and does not effect the accuracy of the numerical control system. Moreover, even long term variations of the clock frequency due to temperature, part degradation and the like will not adversely effect the overall accuracy of the numerical control system of the present invention.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 2 is a timing chart illustrating a number of the control signals within the numerical control system;

FIG. 3 is a schematic view illustrating a portion of the numerical control system; and FIG. 4 is a schematic diagram illustrating a still further portion of the numerical control system of the present invention.

DETAILED DESCRIPTION OF A PREFERRED EMBODIMENT OF THE PRESENT INVENTION

Figure 1:
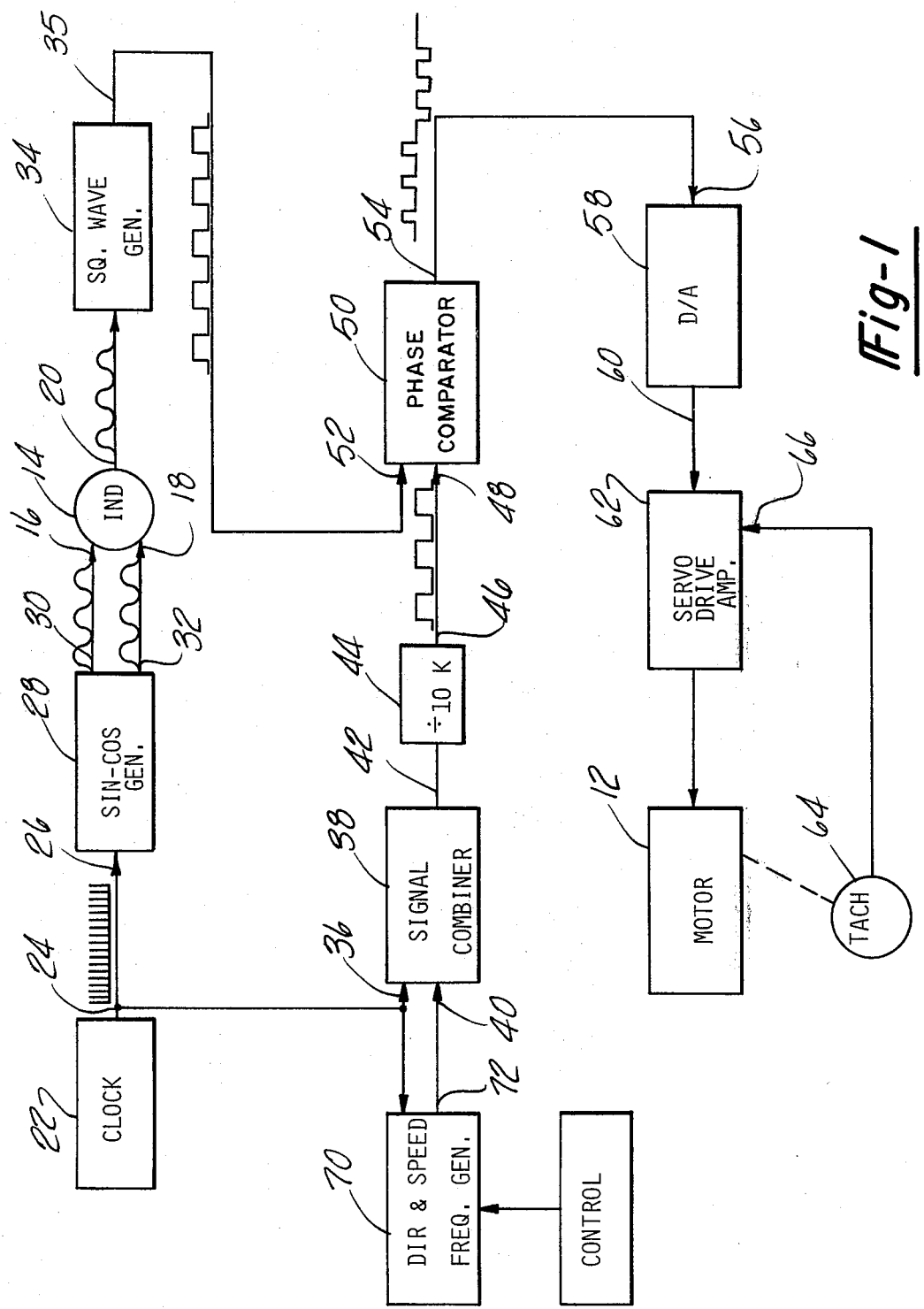
FIG. 1 is a block diagrammatic view illustrating the numerical control system of the present invention.

With reference first to FIG. 1, the numerical control system 10 according to the present invention is thereshown for use with a rotary table (not shown) having a relatively stationary part and a relatively movable part which are rotatably connected together. A reversible motor means 12, the actuation of which will be subsequently described in greater detail, rotatably drives the table movable part with respect to the stationary part.

A position transducer 14, such as an inductosyn, is operatively disposed between the table movable and stationary parts. The position transducer includes a pair of inputs 16 and 18 and an output 20. Since the operation of the inductosyn is well known in the art, its operation will be only briefly and subsequently described.

The numerical control system further includes a free running clock 22 which generates a frequency of approximately 20 megahertz at its output 24. The precise frequency of the clock 22, however, is not critical to the operation or accuracy of the numerical control system 10 and thus can be relatively inexpensive in construction. For example, in the preferred form of the invention, a ring having an odd number of inverters is employed as the frequency generator for the clock 22. The clock 22 further includes suitable means fo shaping its output into a square wave. Again, any conventional means can be used, such as coupling the output from the inverter ring to the clock input of a flip-flop, and utilizing the Q output from the clock as the clock output line 24.

The output 24 from the clock 22 in turn is fed to an input 26 of a sinusoidal wave generator 28. The sinusoidal wave generator 28 has a pair of outputs 30 and 32 on which the sinusoidal wave forms are generated. However, the output on the line 30 is offset by a constant and predetermined phase shift, for example 90 degrees from the wave on the output 32. Thus, for example, the signal on the line 30 carries a sine wave while the signal on the line 32 is a cosine wave. Moreover, the sinusoidal wave generator 28 includes a digital frequency down converter so that the frequency of the sinusoidal wave generator output is a predetermined fraction of its input signal. In the preferred form of the invention, the frequency down conversion performed by the sinusoidal wave generator 28 is by a factor of 10,000 so that the output frequency from the generator 28 is 2 kilocycles. The generator outputs 30 and 32 are respectively connected to the inputs 16 and 18 of the inductoysn 14.

In the well known fashion, the frequency of the output 20 of the inductosyn is the same as the input signals to the inductosyn 14. However, the phase of the inductosyn output signal 20 varies in dependence upon the absolute position of the inductosyn and thus upon the absolute position of the table movable and stationary parts. In the conventional fashion, the output signal from the inductosyn 14 shifts 180 degrees per one degree of revolution of the table rotatable part. In addition, the output 20 from the inductosyn 14 is connected through a square wave generator 34 which converts the sinusoidal output from the inductosyn 14 to a square wave of the same frequency.

The output 24 from the clock 22 is further connected to a signal combiner 38 having an inputs 36, 40 and an output 42. Although the circuitry of the signal combiner 38 will be subsequently described in greater detail, in brief the signal combiner 38 merely adds or subtracts the signals present on both of its inputs 36 and 40 and this combination is then generated on its output 42. Thus, for example, assuming a null signal on the signal combiner second output 40, the output 42 from the signal combiner 38 would be identical to the output present on the clock output 24.

The signal combiner output 42, in turn, is connected to the input of a down frequency converter 44 which produces a square wave at its output 46. Moreover, the down frequency conversion of the converter 44 is identical to the down frequency conversion produced by the sinusoidal wave generator 28, i.e. a factor of 10,000 for example used, so that the frequency at the converter output 46 is identical to the frequency of the outputs 30 and 32 from the sinusoidal wave generator 28.

The output 46 from the frequency down converter 44 is fed to one input 48 of a phase comparator 50 while the output 35 from the square wave generator 34 is connected to a second input 52 of the phase comparator 50. The actual circuitry of the phase comparator 50 will be subsequently described in greater detail, but, in brief, the phase comparator generates a square wave at its output 54 in which the width of the square wave is proportional to the phase difference between the signals on the phase comparator inputs 52 and 48. In the event that the input signals are exactly in phase, no signal is produced at the output 54 of the phase comparator 50. In addition, in the event that the input signals to the phase comparator 50 are not in phase, the phase comparator 50 is able to differentiate whether the input signal at input 52 is leading or lagging the signal at input 48 and to accordingly generate a positive or negative square wave, respectively, at its output 54.

The output 54 from the phase comparator 50 is in turn fed to an input 56 of a digital to analog converter 58. The D/A converter 58 generates an analog signal at its output 60 so that the level of the analog signal at the D/A converter output 60 is proportional to the phase difference between the input signals 52 and 48 to the phase comparator 50. The D/A converter output 60 is connected to the input of a servo drive amplifier 62 which controls the actuation and direction of rotation of the motor 12. A tachometer 64 provides a negative feedback signal 66 to the servo drive amplifier 62 to prevent erratic motor actuation.

Still referring to FIG. 1, a direction and speed frequency generator 70 has an output 72 connected to the second input 40 of the signal combiner 38. The direction and speed frequency generator generates a square wave signal at its output 72 corresponding to both the desired speed and direction of actuation of the motor 12. The circuitry of the direction and speed frequency generator 70 will be subsequently described in greater detail.

Referring now to FIG. 2, a timing diagram illustrating the operation of the numerical control system 10 according to the present invention is thereshown. It will be understood, however, that the timing diagram in FIG. 2 is for illustrated purposes only and is not to scale. Moreover, it will be assumed in FIG. 2 that the table remains stationary, i.e. the motor 12 is not actuated, in order to more clearly illustrate the various timing signals within the system 10.

Referring then to FIG. 2, the uppermost timing signal 80 is representative of the output 80 from the system clock 22. The clock output 80 is a square wave output at a constant and relatively high frequency, for example 20 megahertz.

Still referring to FIG. 2, the third waveform 82 from the bottom illustrates the output waveform from the square wave generator 34. The output from the square wave generator 34 of course, is a square wave at a relatively low frequency, for example 2 kilohertz. Moreover, since it is assumed that the motor 12 and thus the table is stationary, the square wave output 82 from the square wave generator 34 is of a constant frequency and phase.

The second line from the top in FIG. 2 illustrates the output from the direction and speed frequency generator for activating the motor 12 in one direction. To do this, the direction and speed frequency generator 70 generates a square wave 86 having the same width as the clock pulses 80 but which is positioned in between adjacent square wave pulses from the clock 22. Moreover, the direction and speed frequency generator has an output signal ranging in frequency from 0 to 15 kilohertz so that a plurality of clock pulses 80 are generated between each adjacent pulse 86 from the D and S frequency generator 70. Thus, as shown in FIG. 2, three clock pulses are shown between each adjacent pulse 86 from the D and S frequency generator 70 although, in practice, over 100 clock pulses are positioned in between the adjacent pulses 86 from the frequency generator 70.

The signal combiner 38 combines the waveforms 80 and 84 together and produces the signal 88 at its output 42. As shown in FIG. 2, the output signal from the signal combiner in effect has an output frequency equal to the sum of the clock 22 frequency and the frequency from the direction and speed frequency generator 70.

The down frequency converter 44 digitally converts the output signal from the signal combiner 38 as has been previously described. Thus, due to the higher frequency of the signal combiner output 88 and the clock output 80, the output signal 90 from the down frequency converter 44 remains of the same frequency but has a leftward phase shift with respect to the square wave output from the square wave generator 34. Due to this phase shift, the phase comparator 50 generates an output signal 92 representative of the phase difference between the requested position of the motor, as represented by the waveform 90, and the actual position of the motor 12 as represented by the waveform 82. The phase comparator output 92 then activates the motor via the D/A converter 58 and the servo drive amplifier 62 in the direction required to reduce the phase shift between the waveforms 82 and 90 to zero. It will be remembered, of course, that rotation of the table simultaneously rotates the inductosyn 14 and varies the phase of the square wave 82 from the square wave generator 34.

Still referring to FIG. 2, in the event that activation of the motor is desired in the opposite direction, the direction and speed frequency generator 70 generates an output signal 94 as shown in the right half of FIG. 2. The signal 94 from the direction and speed frequency generator 70 not only is of the opposite polarity than that shown in the waveform 84 but also coincides with a clock pulse 80. Thus, when the clock output 80 and the direction and speed frequency generator output 94 are coupled to the signal combiner 38, the signal combiner 38 in effect deletes a pulse in its output signal 88 to the frequency down converter 44. Thus, the output frequency of the signal combiner is effectively equal to the clock frequency output 80 minus the frequency of the signal 94 from the direction and speed frequency generator 70.

Due to the digital frequency conversion produced by the down frequency converter 44, the output signal 90 from the down frequency converter 44 is of the same frequency as the output from the square wave generator 34. However, the phase of the frequency converter output 90 is shifted rightward as shown at 90' with respect to the square wave output from the square wave generator 34. The phase comparator 50 detects the phase shift and generates a square wave signal 92' of the opposite polarity than the signal 92 since the phase comparator differentiates between leading and lagging phase differences. The output from the phase comparator 50 then activates the motor 12 in the opposite direction via the D/A converter 58 and the servo drive amplifier 62.

Still referring to FIGS. 1 and 2, since the frequency down converter 44 decreases the frequency from the signal combiner 38 by a factor of 10,000, 10,000 pulses from the direction and speed frequency generator 70 are required to shift the phase of the output signal from the frequency down converter by a factor of 180 degrees. A 180 degree phase shift from the frequency down converter 44 would correspond to a one degree revolution of the inductosyn 14 since the phase of the inductosyn output 20 shifts 180 degrees per degree of revolution. The actual frequency of the direction and speed frequency generator 70 can then be determined. For example, assuming a 90 degree rotation of the table and thus of the inductosyn 14, is required in one minute, the direction and speed frequency generator 70 must generate 900,000 pulses per minute (90° × 10,000 pulses/degree) or at a frequency of 15 kilohertz. Conversely, if a slower speed of rotation is required, for example, 45 degrees/minute, the direction and speed frequency generator 70 generates an output signal at one-half its frequency, i.e. 7.5 kilohertz for a one minute period.

The digital down frequency conversion of the output signal from the signal combiner 38 also enables extreme accuracy in positioning the work table rotatable part, and thus the inductosyn 14, for fractional parts of one degree of revolution. For example, the direction and speed frequency generator 70 will generate 5,000 pulses to rotate the table rotatable part one half degree while 4221 pulses from the direction and speed frequency control would rotate the table 0.4221 degrees and so on. Accurate positioning of the table at less than 1/1000 degree increments is possible with the numerical control system 10 of the present invention.

With reference now to FIG. 3, the preferred circuit for the phase comparator 50 is thereshown in which the phase comparator 50 has the two inputs 52 and 48 and its output 54. The inputs 48 and 52 are both connected to the inputs of a NAND gate 100 while the inverted signals from the two inputs 52 and 48 are connected to the inputs of a second NAND gate 102. The outputs from the NAND gates 100 and 102 are respectively connected to the set and reset inputs of an RS flip-flop 104.

The Q output from the flip-flop 104 is in turn connected to one input of a pair of output NAND gates 106 and 108. The inverted signal from the first phase comparator input 52 is connected to the other input of the NAND gate 106 while, similarly, the inverted signal from the second phase comparator input 48 is connected to the other input of the output NAND gate 108. The output from the first output NAND gate 106 is connected to the gate of a FET 110 having its source connected to the phase comparator output 54 and its drain connected to a positive voltage. Similarly, the output from the other output NAND gate 108 is connected to the gate of a second FET 112 having its source connected to the phase comparator output 54 but having its drain connected to a negative voltage source. Thus, when the NAND gate 106 is turned on, i.e. its output goes low, a positive voltage is applied to the phase comparator output 54 and conversely for the NAND gate 108.

Still referring to FIG. 3, when the signals to the phase comparator inputs 52 and 48 are in phase with each other, the RS flip-flop 104 switches in unison with the input signals to the phase comparator 50. Simultaneously, the inverted input signals are coupled to the other inputs to the output NAND gates 106 and 108 so that the NAND gates 106 and 108 are never turned on and, correspondingly, the signal at the output 54 of the phase comparator is a null signal.

Conversely, assuming that the signal at the input 52 to the phase comparator 50 leads its other input 48, when the input signal 48 goes low, the Q output of the RS flip-flop 104 remains high until both of the input signals 48 and 52 are low. However, as soon as the signal on the input 48 goes low, the NAND gate 108 is turned on thus turning on the FET transistor 110 and producing a negative voltage at the output 54 of the phase comparator 50. Moreover, the duration of this output signal is substantially the same as the phase difference between the input signals to the phase comparator 50. Conversely, of course, if the signal to the input 52 of the phase comparator 50 lags the signal at the other input 48, the NAND gate 106 is activated thus turning on the FET transistor 112 and producing a positive voltage at the output 54 for the phase comparator 50.

Still referring to FIG. 3, the D/A converter 58 further comprises an operational amplifier 114 having its input connected to the input 56 of the D/A converter 58. In addition, a capacitor 116 is connected between the input and output of the amplifier 114 which charges or discharges in response to an input signal on the phase comparator output 54. Due to the charge and discharge time of the capacitor 116, the output 60 from the D/A converter is proportional to the duration of the input signal to the D/A converter and thus proportional to the phase difference between the inputs 52 and 48 to the phase comparator 50.

With reference now to FIG. 4, a circuit means for the signal combiner 38 is thereshown in which the output from the clock 22 forms one input 36 to the signal combiner 38 while the output from the direction and speed frequency generator 70 is divided into two lines 120 and 122. The frequency generator 70 generates a series of pulses on the line 122 in the event that the frequency generator output is to be added to the clock output to thus increase the output frequency of the signal combiner output with respect to the clock 22. Conversely, the direction and speed frequency generator 70 generates a series of pulses on line 120 in the event that the frequency of the frequency generator 70 is to be subtracted from the clock frequency.

Still referring to FIG. 4, assuming that no signal is present on either of the lines 120 or 122, the clock frequency is inverted by an inverter 124 and fed to one input of a NAND gate 126. The other input to NAND gate 126 is maintained at a high level so that the output from the NAND gate 126 is equal to the input clock frequency. The output from the NAND gate 126 is, in turn, coupled to one input of a further NAND gate 128 having its second input normally maintained at a high level. The output from the second NAND gate 128 forms the output 42 from the signal combiner which, in the absence of the signal on lines 120 or 122, equals the input clock frequency.

Assuming now that the frequency from the frequency generator 70 is to be added to the clock frequency, the signal from the frequency generator 70 is connected to the data input of a D flip-flop 130 while the clock input to the flip-flop 130 is connected to the clock output 24. The D flip-flop 130 also includes a Q output 132 on which a frequency equal to the to the frequency of the input signal on line 122 is generted. This Q output 132 is coupled through a single shot 134 which produces an output signal to the NAND gate 126 to produce an output pulse from the NAND gate 126. Moreover, due to the delay created by the inverter 124, the output from the single shot 134 is positioned in between adjacent clock pulses thus effectively increasing the frequency of the output signal 82 from the signal combiner 38.

In the event that the opposite activation of the motor is required, a series of pulses from the speed and direction frequency converter 70 are produced on line 120 which is connected to the data input of a second D flip-flop 140 while the system clock 22 is connected to the clock input of the flip-flop 140. The Q output from the D flip-flop 140 is connected through a first single shot 12 and a second single shot 144 so that the $\bar{Q}$ output from the single shot 144 is connected as one input to a NAND gate 146. The clock output 24 is in turn connected through three inverters 148 to the other input of the NAND gate 146 and the output from the NAND gate 146 is connected to the other input of the NAND gate 128.

The signal delays caused by the dual single shots 142 and 144 and the three inverters 148 is sufficient so that the output signal from the NAND gate 146 coincides with a clock pulse. Moreover, the output from the NAND gate 146 is normally maintained at a high level in the absence of a signal on the line 20 but, in response to a pulse on the line 120 generates a negative pulse which coincides with the output from the NAND gate 126 thus removing a pulse from the output 42 of the signal combiner 38 in the desired fashion.

FIG. 4 also illustrates the down converter 44 as a divide by 10,000 counter. In practice, of course, a plurality of flip-flops are chained together in order to achieve the desired divide by 10,000.

The remaining components of the numerical control system 10 according to the present invention are well known in the art, and, therefore, will now be described in greater detail.

From the foregoing it can be seen that the numerical control system according to the present invention is advantageous in several different respects. First, since the direction and speed frequency generator 70 either adds or deletes pulses from the system clock prior to the down frequency conversion from the signal combiner 38, the table can be rotated and accurately automatically controlled in fractional portions of one degree of rotation. In practice, accurate positioning of the table is achievable in less than one 1/1000 of a degree of rotation of the table.

A still further advantage of the numerical control system according to the present invention is that the frequency of the system clock 22, either instantaneous or over the long term, is not critical to the accuracy or position of the work table rotatable part. The present invention achieves this by a digital down conversion of the clock both by the frequency converter 44 and in the sinusoidal wave generator 28 and also by synchronizing the direction and speed frequency generator 70 with the clock 22. Thus, even a wide variation of the clock frequency would not effect the accuracy of positioning of the table although the speed of rotation of the table would be slightly effected for the same frequency output from the direction and speed frequency generator 70. Moreover, this feature of the present invention also permits a relatively inexpensive clock to be used without sacrificing accuracy.

Having described my invention, however, many modifications thereto will become apparent to those skilled in the art to which it pertains without deviation from the spirit of the invention as defined by the scope of the appended claims.

I claim:

1. A system for controlling the position of a movable member relative to a stationary member, said system comprising:
   a reversible motor means for moving said movable member along a predetermined path of movement;
   a position transducer operatively connected between said movable and stationary members, said transducer having a pair of inputs and an output;
   clock means for generating an output frequency at a highly elevated first frequency;
   a sinusoidal wave generator having an input directly connected to the clock means output, said wave generator being operable to produce a pair of sinusodial wave outputs at a predetermined second frequency, said second frequency being equal to said first frequency divided by a predetermined constant, said sinusoidal wave outputs having a predetermined and constant phase shift difference relative to each other and wherein each wave generator output is connected to one transducer input;
   said transducer being operable to vary the phase of its output signal in dependence upon the relative positions of said movable and stationary members;
   signal combiner means having two inputs and an output for adding the input signals together to form the output signal, said clock means output being connected to one of said combiner inputs;
   pulse generator means for generating an output train of pulses of a frequency and polarity corresponding to the desired speed and direction of movement of the movable member relative to the stationary member, said pulse generator means output being connected to the other input of the signal combiner, and said pulse generator means having two inputs, said clock means output being connected to one pulse generator means input for synchronizing said pulse generator means with said first frequency and a control circuit which generates a signal on an output indicative of the desired speed and direction of movement of the movable member, said control circuit output being connected to the other pulse generator means input;
   means for converting the frequency of the combiner means output to said second predetermined frequency by dividing said combiner means output by said predetermined constant;
   means for comparing the phase of the frequency converter means output and the transducer output and for generating an output signal representative of the phase difference; and
   means responsive to said phase comparing means for actuating said motor means.

2. The invention as defined in claim 1 wherein the motor activating means further comprises a D/A converter and an amplifier, said D/A converter having an input connected to the output from the pulse comparing means and an output connected to an input of the amplifier, said amplifier having an output connected to the motor means.

3. The invention as defined in claim 2 wherein said amplifier has a negative feedback input, said system further comprising a tachometer operatively coupled to said motor means, said tachometer having an output signal connected to the amplifier negative feedback input.

4. The invention as defined in claim 1 wherein said position transducer is an inductosyn and wherein said second predetermined frequency is in the range of 1500-2500 cycles per second.

5. The invention as defined in claim 1 and further comprising means for converting said position transducer output to a square wave and wherein said frequency converter output is a square wave.

6. The invention as defined in claim 1 wherein said sinusoidal wave generator digitally converts said clock frequency to said second frequency.

7. The invention as defined in claim 6 wherein said frequency converter means comprises a down counter.

8. The invention as defined in claim 7 wherein said down counter is a divide by 10,000 down counter.

9. The invention as defined in claim 1 wherein said pulse generator generates a series of pulses of the same polarity in between adjacent pulses from the clock means output signal to activate the motor means in one direction and wherein said pulse generator generates a series of pulses of the opposite polarity and coinciding with pulses from the clock means output signal to activate the motor means in the opposite direction.

10. The invention as defined in claim 1 wherein said comparing means further comprises a pair of input NAND gates and an output, the input signals to the signal combiner means being connected to the inputs of one input NAND gate and the inverted input signals to the signal combiner means being connected to the inputs of the other input NAND gate, the outputs from the input NAND gates being respectively connected to the R and S inputs of an RS flip-flop, a pair of output NAND gates each having two inputs and an output, the inverted signal combiner input signals being connected to one input of each output NAND gate and an output from the RS flip-flop being connected to the other input of both output NAND gates so that the output of one output NAND gate becomes active when one signal combiner input leads the other while the output of the other output NAND gate becomes active when said one signal combiner input lags the other signal combiner input.

11. The invention as defined in claim 10 wherein the duration of activation of either output NAND gate is substantially equal to the duration of the phase shift between the signal combiner input signals.

12. The invention as defined in claim 10 wherein the output of one output NAND gate is connected to the gate of a first field effect transistor while the output of the other output NAND gate is connected to the gate of a second field effect transistor, the drains of the field effect transistors being connected to voltage sources of opposite polarity, and the sources of said field effect transistors being connected together to form the output signal of the means for comparing.

13. The invention as defined in claim 11 wherein said means responsive to the phase comparing means further comprises an operational amplifier having an input and an output and a capacitor connected between the operational amplifier input and output.

* * * * *

UNITED STATES PATENT AND TRADEMARK OFFICE
CERTIFICATE OF CORRECTION

PATENT NO. : 4,319,172
DATED : March 9, 1982
INVENTOR(S) : Ryszard Sieradzki

It is certified that error appears in the above—identified patent and that said Letters Patent is hereby corrected as shown below:

Column 8, line 65, after frequency equal delete "to the".

Column 10, line 17, delete "sinusodial", insert --sinusoidal--.

Column 10, line 59, delete "pulse", insert --phase--.

Signed and Sealed this

Eighteenth Day of May 1982

[SEAL]

Attest:

Attesting Officer

GERALD J. MOSSINGHOFF
Commissioner of Patents and Trademarks